Jan. 14, 1964    H. E. GERLAUGH    3,117,748
TIP TURBINE DUCTED FAN POWERED AIRCRAFT
Filed April 20, 1961    2 Sheets-Sheet 1
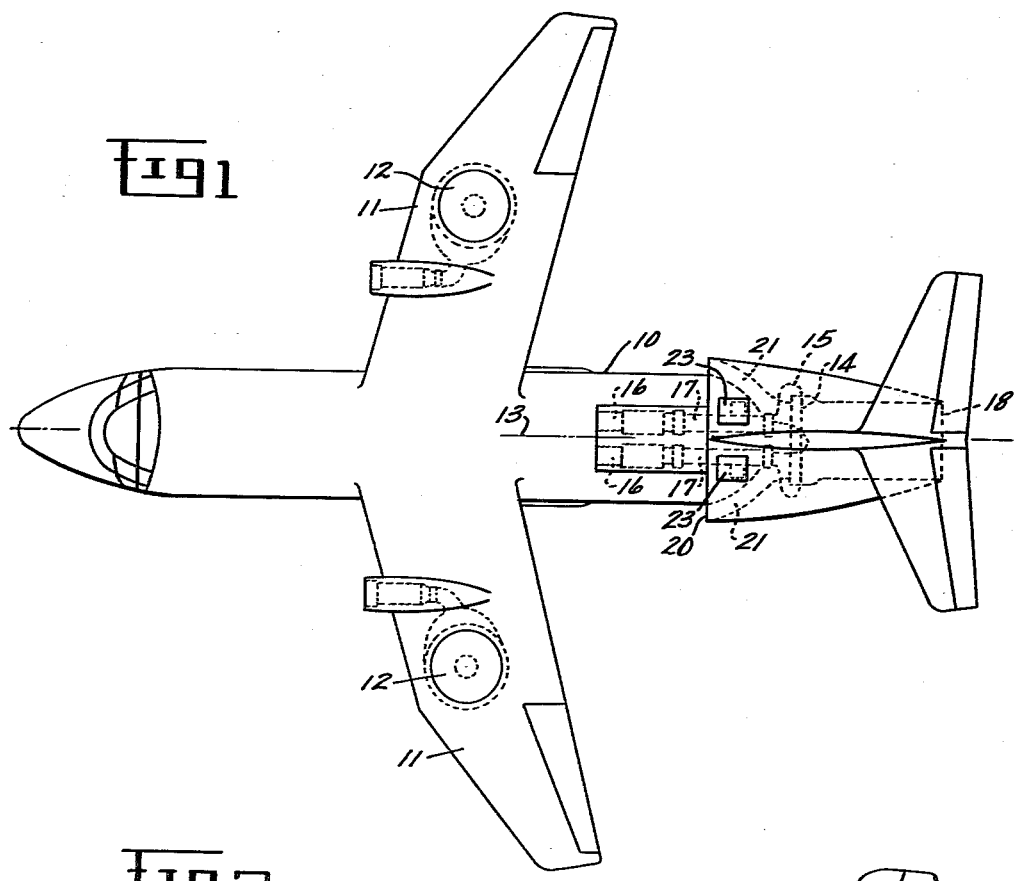
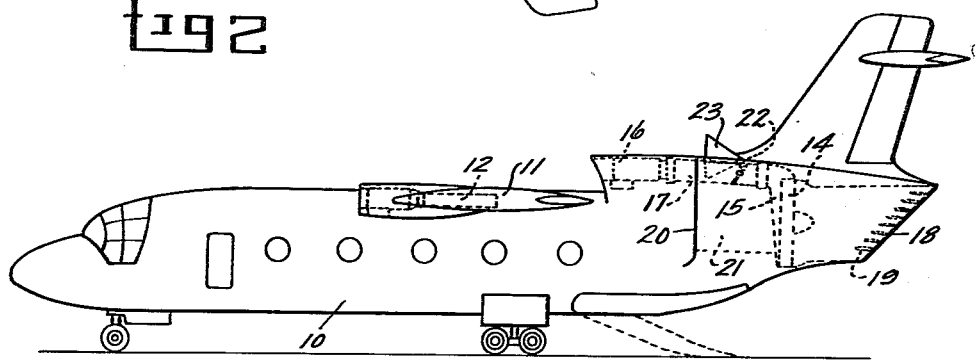
INVENTOR.
HOWARD E. GERLAUGH
BY John F. Cullen
ATTORNEY Jan. 14, 1964 H. E. GERLAUGH 3,117,748
TIP TURBINE DUCTED FAN POWERED AIRCRAFT
Filed April 20, 1961 2 Sheets-Sheet 2
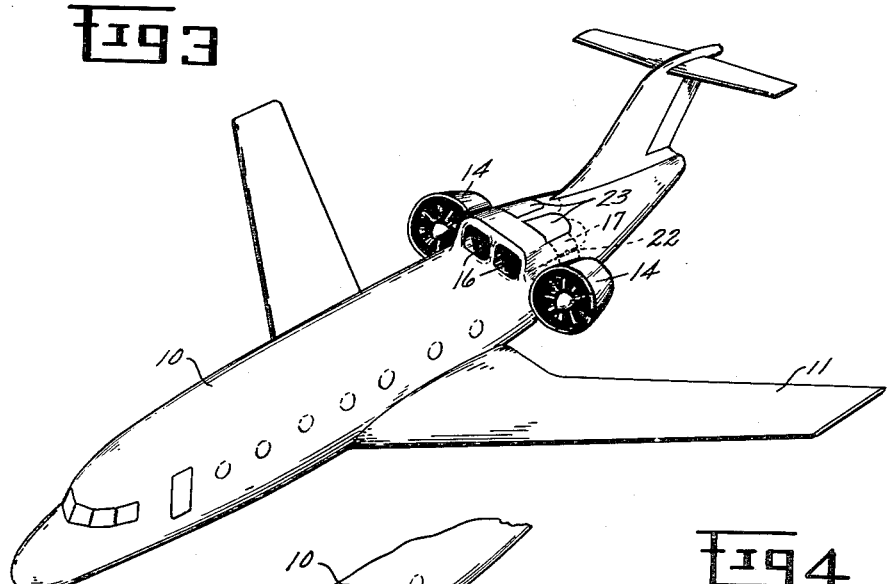
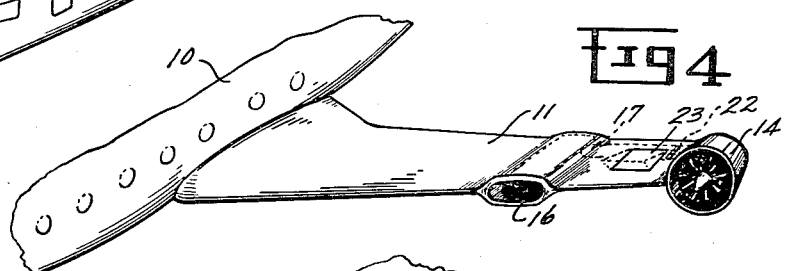
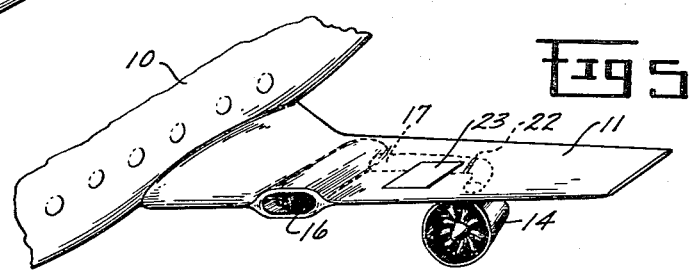
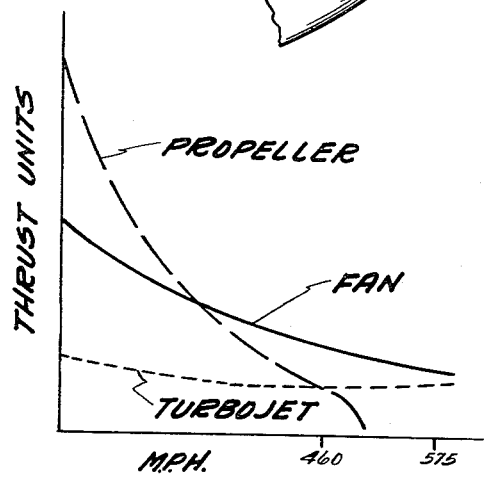
INVENTOR.
HOWARD E. GERLAUGH
BY
ATTORNEY- United States Patent Office 3,117,748
Patented Jan. 14, 1964

3,117,748
TIP-TURBINE DUCTED FAN POWERED AIRCRAFT
Howard Edmonds Gerlaugh, Cincinnati, Ohio, assignor to General Electric Company, a corporation of New York
Filed Apr. 20, 1961, Ser. No. 104,326
9 Claims. (Cl. 244—15)

The present invention relates to fan powered aircraft and, more particularly, to aircraft which are powered by tip turbine fans driven by gas generating means remote from the fan means.

In present day high speed aircraft, it is desirable to provide an aircraft powerplant combination that is as light as possible, has economical high speed fuel consumption, and has increased thrust for take-off. One of the powerplants that has come along recently and offers improvement in the specific fuel consumption (SFC) is the powerplant known as the fan. This has taken several forms useful in various missions. The main purpose of the fan is to move large quantities of air at relatively low pressure ratio to provide high thrust and good propulsive efficiency. In the low speed ranges, up to 350–450 miles per hour low pressure ratios are available by the conventional propeller or the ducted or shrouded propeller. However, such a combination becomes inefficient or is not operable as the speed is increased above 450 miles per hour since the thrust from such a powerplant falls off extremely rapidly. At higher pressure ratios for higher speeds, the turbojet is the most promising. At these high speeds the thrust remains fairly high and is, of course, much higher than the propeller can possibly obtain. However, in the low speed ranges, such as at take-off, the thrust is considerably below that of the propeller resulting in the extremely long take-off runs that are necessary with turbojet aircraft. The fan powered aircraft offers advantages at both ends of the speed range in that it has much higher thrust than the turbojet in the low speed ranges and is better than the turbojet in the high speed ranges up to around 550 miles per hour. Beyond that, the turbojet is superior. Of the fan type powerplants, the tip turbine fan appears the most promising for use in the range from 0 to approximately 500 miles per hour as being superior to the propeller in the high speed ranges and superior to the turbojet in the low speed ranges. To date, such a powerplant has been used only for vertical take-off aircraft or for a combination of vertical take-off and horizontal propulsion with the use of louvers to vector the thrust in both positions. The present invention discloses a tip turbine fan propulsion system in an aircraft for conventional cruise operation. The term tip turbine fan is meant to be an air moving fan which carries turbine blades on the tips of the fan blades and the turbine blades are driven by exhaust gas generators in order to rotate the fans and move large quantities of air. The use of such fans in a vertical take-off and landing aircraft is not the arrangement herein disclosed. It is known that such tip turbine fans have low SFC because of the superior thrust of such a powerplant over its operating range. For example, at take-off the thrust of a fan is approximately 2 to 4 times more than a turbojet and this means an SFC of ½ to ¼ that of the turbojet since the fuel consumption is proportional to the thrust output. At cruise at 500 miles per hour the fan produces 25% more thrust than the turbojet and consequently has 25% better SFC. In addition, thrust reversal on such fan powered aircraft as disclosed herein becomes a problem because the usual thrust reverser mechanism carried at the aft end of the powerplant is so large that it may comprise up to 50 to 70% of the weight of the fan. Consequently, the instant invention also includes a thrust reversal arrangement that is part of the overall combination to avoid the heavy weight necessary with thrust reversers on the powerplant. Further, all strictly cruise powerplants have carried the gas generating means usually concentrically within the powerplant as in the case of a jet engine with a forward or aft fan. The instant invention permits the gas generators to be remotely and non-concentrically placed within the the aircraft with separate inlets from the cruise powerplants and preventing flow mixing resulting in greatly flexibility and lighter weight powerplants and a better balanced aircraft. An aerodynamic or pneumatic coupling ducts the exhaust gases of the gas generator to the tip turbines around the fan. The central location of the gas generator in a conventional arrangement is substantially impossible without extremely complicated duct work in a fan powered aircraft.

The main object of the present invention is to provide an aircraft cruise powered by tip turbine fans in order to obtain the high thrust-low SFC characteristics.

Another object is to provide such an aircraft wherein the combination of parts lend themselves to a simple thrust reversal arrangement.

A further object is to provide such an aircraft wherein the fans are mounted with their axis of thrust or rotation substantially parallel with the longitudinal centerline of the aircraft and the gas generators powering the fans are remotely disposed to simplify the ducting connections.

Briefly stated, the invention herein provides an aircraft of the conventional type in that it has wings and a fuselage. The aircraft is powered by a tip turbine fan means supported thereon either in the fuselage or on the wings and the fan means is oriented so that its axis of rotation is substantially parallel with the longitudinal centerline of the aircraft. Separate and remote gas generating means are disposed preferably but not necessarily within the aircraft and connect with the fan by a pneumatic duct for direct drive of the fan to eliminate gearing and linkage connections. Additionally, for thrust reversal, a diverter valve is disposed in the duct connecting the gas generator means and the turbine to divert the gas generator exhaust through a small nozzle directed substantially forwardly for reverse thrust of the aircraft.

While the specification concludes with claims particularly pointing out and distinctly claiming the subject matter which I regard as my invention, it is believed the invention will be better understood from the following description taken in connection with the accompanying drawings in which:

FIGURE 1 is a plan view of a typical aircraft employing a single tip turbine fan within the fuselage and having thrust reversing means;

FIGURE 2 is an elevation view of FIGURE 1 illustrating the orientation of the fan within the aircraft;

FIGURES 3–5 are additional modifications showing alternate positioning of the tip turbine fans, and;

FIGURE 6 is a graph showing a comparison of different powerplants.

Referring first to FIGURE 1, there is shown a particular modification of an aircraft employing a single tip turbine fan mounted within the fuselage. The aircraft comprises a fuselage 10 with wings 11 extending therefrom in the usual manner. Although not forming part of the present invention, if the aircraft is to be of the vertical lifting type, suitable fans 12 having associated powerplants and interconnecting ducts may be supplied in a well known manner. It should be understood that this is merely an adjunct to the aircraft to be described and the invention herein described is primarily directed to the cruise phase and arrangement of any conventional aircraft. The center of gravity of the aircraft will normally fall on the longitudinal centerline 13 someplace in the wing area. In order to obtain high speed cruise at low specific fuel consumption, a tip turbine fan 14 is mounted or oriented in the fuselage for rotation about longitudinal centerline 13. The tip turbine fan is of the general form shown in U.S. Patent 3,033,492 assigned to the same assignee of the instant invention. Thus, the fan comprises turbine blades mounted on the periphery of fan blades to drive the fan blades for the movement of large quantities of relatively low velocity air. By the increase in mass, a large increase in thrust is obtained. The turbine blades are fed by a suitable scroll 15 which may be of the partial or complete admission type.

In order to drive the tip turbine fan, gas generating means 16 is remotely disposed within the fuselage. The term "remote" means separate from the fan envelope. This means may comprise plural gas generators as shown for safety reasons or may comprise a single gas generator. The exhaust of the gas generating means is directed to the scroll 15 through pneumatic or duct means 17. The connecting duct means 17 may be of the common or non-common duct type, as discussed in the above patent, each of which has its advantages and disadvantages and is more completely described and discussed in said patent. It is to be noted that such a connection, which is a pneumatic-type connection, is a direct drive and dispenses with the usual linkages and gearing required and therefore reduces the weight which is an important factor in aircraft.

The main propulsive force of the aircraft is obtained by the movement of large quantities of low pressure air through the fan to exhaust it rearwardly with the combustion products through nozzle 18. Suitable louvers 19, in themselves forming no part of the present invention may be placed in the nozzle to assist in pitch control and provide a vertical component when required. For purposes of the instant invention the louvers 19 are not required. In order to obtain the large quantities of air required by the fan, forwardly directed air inlet means 20 extends outwardly of the fuselage and around the fuselage although, under normal circumstances, would not extend around the bottom portion of the fuselage where debris might be sucked into the fan when the aircraft is on the ground. Thus, the inlet extends substantially around the fuselage as shown in FIGURE 2. Suitable passage means 21 directs the inlet air through the fan 14.

The location of the gas generating means 16 within the fuselage has thrust reversing advantages as will be pointed out. Additionally, balancing of the aircraft is simplified as well as servicing. Further, the remote location permits separate unobstructed and non-interfering inlets and less complicated interconnecting duct work when a tip turbine fan is used. It is to be noted, from FIGURE 2, that the gas generating means may be conveniently located high within the fuselage to permit cargo or passenger facilities beneath the gas generators.

Referring next to FIGURE 6, there is shown a typical plot of thrust in comparative units versus the speed of the various types of powerplants using the same basic gas generator. As can be seen, the propeller has high thrust, even higher than the tip turbine fan, at very low speed resulting in short take-off characteristics of the aircraft. However, it falls off very rapidly and becomes substantially useless at the high speeds. By contrast, the turbojet has a low thrust at the low speeds requiring extremely long runways to take-off and improves as the speed goes up so, as is well known, is good thrustwise at high speeds. The tip turbine fan arrangement of the instant invention has some of the advantages of both powerplants. The thrust at low speed is considerably higher than that of the turbojet which thrust may vary from two to four times the amount the turbojet will deliver. This is because the fan is moving a large amount of air at slower velocities and the thrust is equal to the mass of the air times the velocity. Thus, at low flight speed the fan obtains high augmentation and this continues up to speeds in the neighborhood of 575 miles an hour or slightly above where the turbojet line crosses the fan line and becomes superior. Since the fan in the neighborhood of 500 miles an hour has roughly 25% more thrust than the turbojet it also has a 25% improvement in the cruise SFC. This will vary of course with the cruise speed but it can be seen from the graph the advantages of the tip turbine fan for cruise. Thus, the fan has the ability to fly at relatively high speeds and match the turbojet whereas at low speeds it is considerably superior to the turbojet thus requiring much shorter runways approaching those of the propeller but having considerably higher high speed thrust than the propeller driven aircraft. Such an arrangement as described herein is superior to the propeller and turbojet arrangement since it permits speeds up to 550 miles an hour with much higher low speed thrust than the turbojet and much higher high speed thrust than the propeller.

In any reaction engine for aircraft use, it is necessary to use thrust reversal to stop the aircraft. With the use of a tip turbine fan, conventional thrust reversing mechanism becomes prohibitive in weight. This is because the fan is relatively large in diameter and a thrust reverser for such a structure would weigh 50 to 75% of the basic fan weight. The arrangement disclosed permits a relatively simple thrust reversing mechanism to be utilized by the remote placement of the gas generating means. Such thrust reverser is light in weight and extremely effective.

Thrust reversal is obtained in the present combination by locating a valve such as a diverter valve in the duct connecting the remote gas generator and the tip turbine fan which valve is indicated at 22. A forwardly directed nozzle means 23 which is preferably retractable and is only diagrammatically shown in the illustration in open solid position and, in dotted closed fuselage-flush position, is disposed adjacent the valve. It can be seen that closing the valve diverts the exhaust gases through the nozzle 23 to provide reverse thrust and opening the valve passes the exhaust gases to the tip turbine fan for propulsion. Such selective thrust reversal means is relatively small and light weight as compared to the structure and weight of the rest of the equipment and is permitted by the remote mounting of the gas generators as well as the pneumatic coupling between the gas generators and the turbine. Additionally, there is no drag by virtue of the compact retractable thrust reverser and thus no penalty is suffered in flight cruise operation.

While forming no part of the present invention, it is to be noted that the forward inlet 20 may be so disposed as to ingest the boundary layer air along the fuselage to reduce drag and improve specific fuel consumption of the powerplant whereas the gas generator inlets are separate and removed so as to receive only full ram air pressure.

Referring next to FIGURES 3-5, wherein like numerals refer to like parts, in FIGURE 3 there is shown an aircraft employing external fuselage mounted cruise tip turbine fans having remote duct connected gas generators and thrust reversal means in the duct which fans are of the general type shown in said referenced patent but are not rotatable as disclosed and claimed therein.

FIGURE 4 shows an aircraft with fans mounted on the wing tips and having remotely duct-connected gas generators disposed within the wings (which is intended to include pylons) with thrust reversal means therebetween.

FIGURE 5 is similar to FIGURE 4 illustrating the fans mounted on pylons and supported on the wings and the gas generating means in the wings which may include the pylons.

The modifications of FIGURES 3-5 have the same advantages as those pointed out with respect to FIGURE 1 although employing a plurality of fans symmetrically arranged for balancing purposes. Again the remote gas generator means and the pneumatic duct interconnection permits the effective use of a light weight thrust reverser as well as simplified ducting by reason of the arrangement using a tip turbine fan and ducting the exhaust gases to a scroll around the periphery of the fan. While these modifications are only diagrammetrically shown, it will be apparent that common and non-common ducting arrangements as shown in the referenced patent may be used as therein described.

While I have hereinbefore described the preferred forms of my invention, obviously many modifications and variations of the present invention are possible in the light of the above teachings. It is therefore to be understood that within the scope of the appended claims, the invention may be practiced otherwise than as specifically described.

I claim:

1. An aircraft comprising, a fuselage, wings extending therefrom, tip turbine fan powered thrust means supported on said aircraft, an inlet for said fan thrust means, the axis of rotation of the fan being substantially parallel with the longitudinal centerline of the aircraft, gas generating means with a forwardly directed inlet carried by the aircraft remote from and non-concentric with the thrust means, said forwardly directed inlet being separate and remote from said fan inlet, and a duct interconnecting the remote gas generator means and thrust means directing the exhaust gas of the generator for direct drive of the tip turbine for movement of air rearward by said fan.

2. Apparatus as described in claim 1 having a substantially forwardly directed nozzle connected to said duct and a valve in said duct to selectively direct exhaust gas to said turbine and to said nozzle for reverse thrust.

3. Apparatus as described in claim 1 wherein said thrust means is disposed on each side of said fuselage aft of the aircraft center of gravity and said gas generator means is carried within said fuselage.

4. Apparatus as described in claim 3 having a substantially forwardly directed nozzle connected to said duct and a valve in said duct to selectively direct exhaust gas to said turbine and said nozzle for reverse thrust.

5. Apparatus as described in claim 1 wherein said thrust means is carried by said wings and said gas generator means is carried within the wings.

6. Apparatus as described in claim 5 having a substantially forwardly directed nozzle connected to said duct and a valve in said duct to selectively direct exhaust gas to said turbine and said nozzle for reverse thrust.

7. An aircraft comprising, a fuselage, wings extending therefrom, a tip turbine fan powered thrust means supported within said fuselage aft of the center of gravity of the aircraft, said fan means being oriented within said fuselage for rotation about an axis substantially coinciding with the longitudinal centerline of the aircraft, forwardly directed air inlet means extending around said fuselage and directing air through said fan and exhausting rearwardly, remote non-concentric gas generator means carried substantially within said fuselage and having separate inlet means, and a duct interconnecting said remote gas generator means and turbine means directing the exhaust gas of the generator for direct drive of the tip turbine for movement of air rearward by said fan.

8. Apparatus as described in claim 7 having substantially forwardly directed nozzle means external of said fuselage, a valve in said duct to selectively direct exhaust gas to said turbine and said nozzle for reverse thrust.

9. Apparatus as described in claim 8 wherein said forwardly directed nozzle means is retractable into said fuselage.

References Cited in the file of this patent

UNITED STATES PATENTS

| 2,477,637 | Mercier | Aug. 2, 1949 |
| 2,604,277 | Anxionnaz | July 22, 1952 |
| 2,644,298 | McLeod | July 7, 1953 |
| 3,018,034 | Ferri | Jan. 23, 1962 |

FOREIGN PATENTS

| 745,720 | Great Britain | Feb. 29, 1956 |